Figure 1:
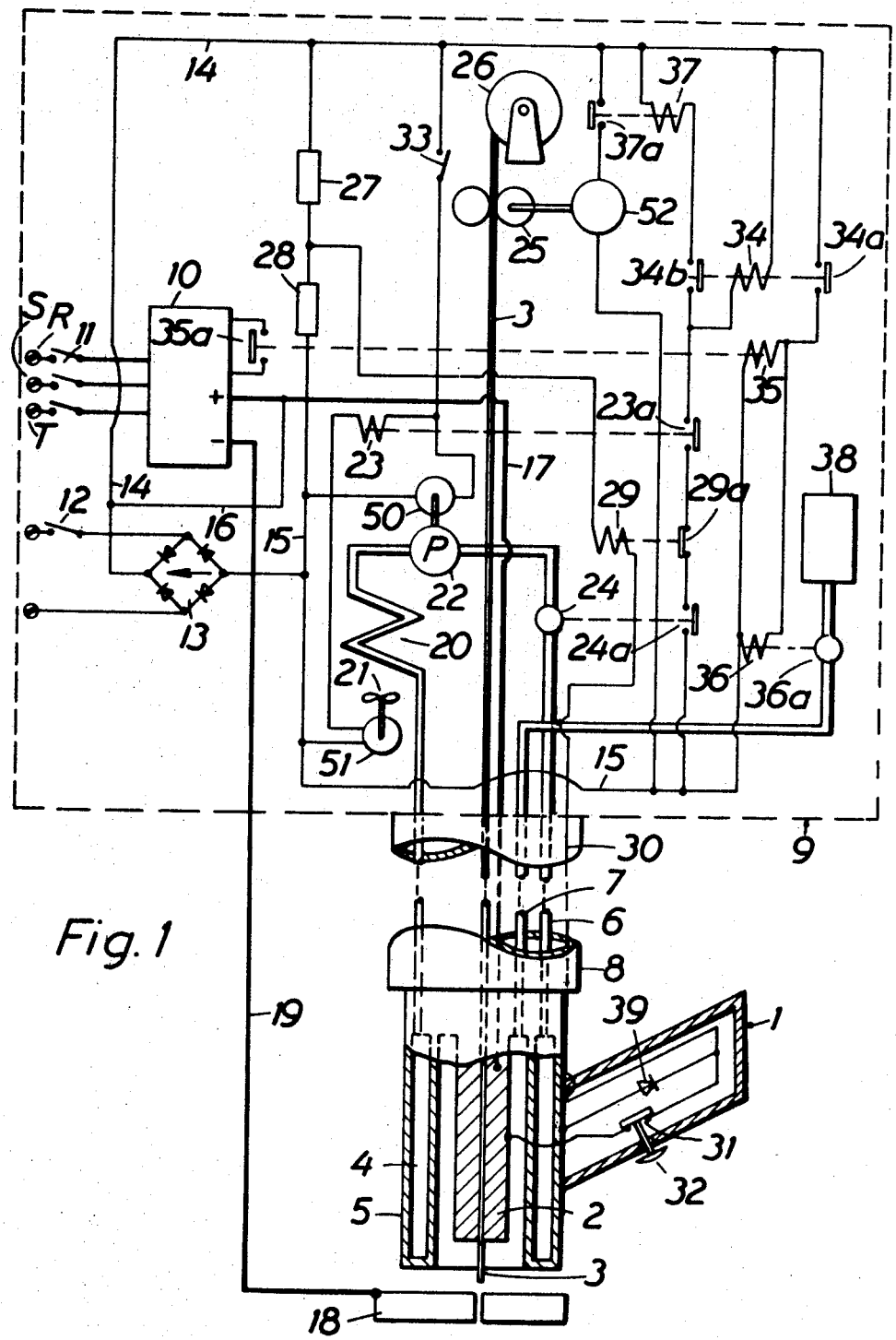

United States Patent

[11] 3,582,606

| | | | | |
|---|---|---|---|---|
| [72] | Inventors | Jan-Erik Henriksen;<br>Klas Bertil Weman, both of Laxa, Sweden | | |
| [21] | Appl. No. | 837,439 | | |
| [22] | Filed | June 30, 1969 | | |
| [45] | Patented | June 1, 1971 | | |
| [73] | Assignee | Elecktriska Svetsningaktiebolaget<br>Gothenburg, Sweden | | |
| [32] | Priority | July 8, 1968 | | |
| [33] | | Switzerland | | |
| [31] | | 9358/68 | | |

[54] GAS-SHIELDED CONSUMABLE ELECTRODE ARC WELDING
13 Claims, 2 Drawing Figs.

[52] U.S. Cl. .................................................. 219/130,
219/131, 219/137
[51] Int. Cl. .................................................. B23k 9/00
[50] Field of Search .......................................... 219/130,
131, 131 F, 131 R, 137, 69 S, 69 C; 13/27

[56] References Cited
UNITED STATES PATENTS

| | | | | |
|---|---|---|---|---|
| 1,778,398 | 10/1930 | Northrup..................... | | 13/27 |
| 2,833,913 | 5/1958 | Bernard....................... | | 219/130 |
| 2,938,994 | 5/1960 | Van Der Willigen et al.. | | 219/130X |

*Primary Examiner*—J. V. Truhe
*Assistant Examiner*—C. L. Albritton
*Attorney*—Cameron, Kerkam & Sutton ABSTRACT: In gas-shielded arc welding with a fusible electrode which is pushed by a motor-driven wire advancing mechanism towards the workpiece through a guide and contact member serving to transmit the welding current to the electrode, said guide and contact member being surrounded by a shielding gas nozzle electrically insulated from said guide and contact member, the insulation resistance between said guide and contact member and said shielding gas nozzle is monitored to provide an output signal when said resistance is lower than a predetermined magnitude.

INVENTORS
JAN-ERIK HENRIKSEN
KLAS BERTIL WEMAN
BY
Cameron, Kerkam + Sutton
ATTORNEYS

GAS-SHIELDED CONSUMABLE ELECTRODE ARC WELDING

Apparatus for gas-shielded arc welding with a fusible electrode comprising a guide and contact member adapted to guide the electrode tip towards the welding spot, circuit means connecting said guide and contact member to one terminal of a source of welding power, a shielding gas nozzle surrounding said guide and contact member, said nozzle being electrically insulated from said guide and contact member, conduit means connecting said nozzle to a source of shielding gas, a valve in said conduit means, a wire advancing mechanism adapted to push the electrode through said guide and contact member, a motor for driving said mechanism, a monitoring circuit including the resistance between said guide and contact member and said shielding gas nozzle as well as a source of control current and means for sensing a change of monitoring circuit conditions resulting from a decrease of the magnitude of said insulation resistance, and indicating and/or control means adapted to be actuated by said sensing means on detection by said sensing means of a magnitude of the insulation resistance below a predetermined value.

This invention relates to gas-shielded consumable electrode arc welding. More particularly, the invention relates to gas-shielded arc welding with a consumable electrode which is pushed by a motor driven electrode advancing mechanism towards the workpiece through a guide and contact member serving to transmit the welding current to the electrode, said guide and contact member being surrounded by a shielding gas nozzle electrically insulated from said guide and contact member.

In this kind of welding, some difficulties are caused by the tendency of the welding spatter to enter the passage between the guide and contact member and the shielding gas nozzle, resulting in a gradually growing accumulation of spatter in said passage. Said accumulation has to be removed from time to time, as otherwise not only the supply of shielding gas to the welding arc, but also the electrical insulation of the shielding gas nozzle from the guide and contact member may be impaired. If the shielding gas nozzle is in contact with the work, the deposit of spatter between the nozzle and the guide and contact member may initiate an arc discharge between said parts, resulting in both parts being ruined.

To ensure that the accumulation of spatter is removed in time, the invention seeks to provide a method and apparatus whereby a signal is derived from the condition of the electrical insulation of the shielding gas nozzle from the guide and contact member.

The method according to the invention comprises monitoring the insulation resistance between the guide and contact member and the shielding gas nozzle to provide an output signal when said resistance is lower than a predetermined magnitude.

In the preferred way of carrying out the invention, said signal is used to operate switch means to break the welding circuit. Preferably said signal operates means for stopping the advancement of the electrode and means for cutting off the supply of shielding gas to the shielding gas nozzle.

The invention also comprises an improvement in apparatus for gas-shielded arc welding with a fusible electrode comprising a guide and contact member adapted to guide the electrode tip towards the welding spot, circuit means connecting said guide and contact member to one terminal of a source of welding power, a shielding gas nozzle surrounding said guide and contact member, said nozzle being electrically insulated from said guide and contact member, conduit means connecting said nozzle to a source of shielding gas, a valve in said conduit means, an electrode advancing mechanism adapted to push the fusible electrode through said guide and contact member, and a motor for driving said mechanism, said improvement comprising a monitoring circuit including the insulation resistance between said guide and contact member and said shielding gas nozzle as well as a source of control current and means sensing a change of monitoring circuit conditions resulting from a decrease of the magnitude of said insulation resistance, and indicating and/or control means adapted to be actuated by said sensing means on detection by said sensing means of a magnitude of the insulation resistance below a predetermined level.

In the preferred embodiments of the invention, said control means comprises switching means adapted on actuation by said sensing means to break the welding circuit.

Figure 2:
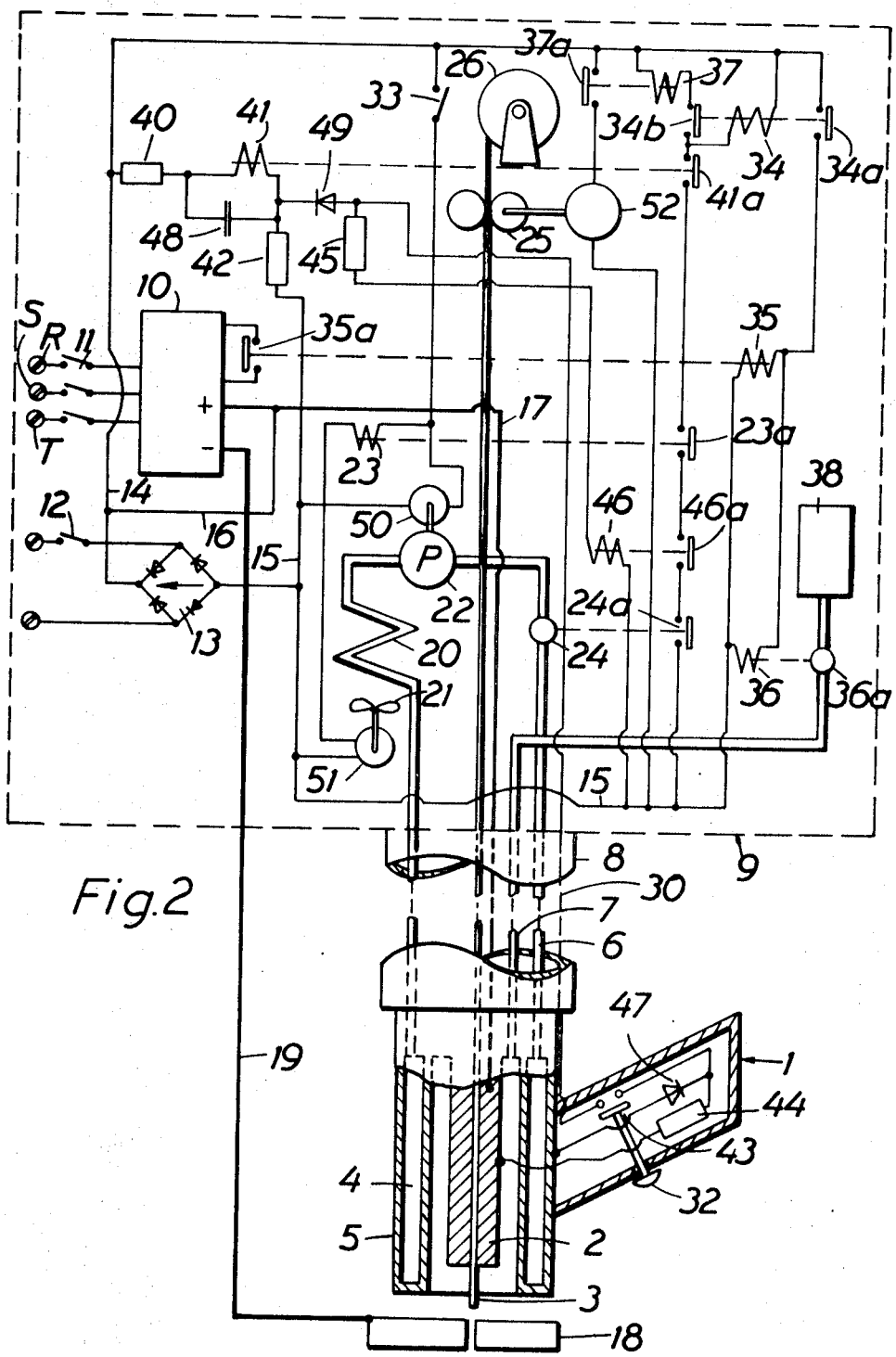

The invention will be further described, by way of example, with reference to the accompanying drawings, in which:

FIG. 1 is a schematic representation of a device incorporating the invention, and FIG. 2 is a schematic representation of another embodiment of the invention.

In the device of FIG. 1, a schematically shown welding gun 1 comprises a guide and contact tube 2 for a fusible electrode 3 and a shielding gas nozzle 5 concentrically surrounding the contact tube 2. The shielding gas nozzle is provided with a cooling chamber 4 connected to conduits 6 for a cooling agent. The space enclosed between the shielding gas nozzle and the contact tube serves as a gas passage to which a shielding gas is supplied by a conduit 7 connected to a source 38 of shielding gas through a magnet valve 36a. All of the conduits and electric conductors connected to the welding gun are compounded into a flexible hose unit 8 connected to a supply unit 9 containing all of the control devices and sources of supply required for the operation of the welding gun. A welding rectifier 10 forming part of the supply unit 9 is connected to three-phase mains R, S, T through a switch 11. A single-phase rectifier 13 connected to a source of AC voltage through a switch 12 supplies a positive bus bar 14 and a negative bus bar 15 feeding the various relay and control circuits of the supply unit. A conductor 16 connects the positive bus bar 14 with the positive terminal of the welding rectifier. A welding current conductor 17 connects the positive terminal of the welding rectifier with the contact tube 2 of the welding gun. The negative terminal of the welding rectifier is connected to the work 18 by a conductor 19. The liquid cooling agent of the welding gun is cooled and circulated by a cooling unit comprising a tube coil 20, a fan 21 driven by a motor 51, and a pump 22 driven by a motor 50 for circulating the cooling agent. The fan motor circuit includes the winding of a relay 23. A flow sensing device 24 is provided in the coolant circulation system. A wire advancing mechanism 25 driven by a motor 52 feeds a wire 3 supplied by a wire spool 26 to the welding gun through the hose unit 8.

A voltage divider comprising two resistors 27 and 28 is connected between the bus bars 14 and 15. The resistor 27 is connected in parallel to a circuit branch comprising the winding of a start relay 29, a control conductor 30 forming part of the hose unit 8, a normally closed contact 31 of a pushbutton switch 32 provided in the welding gun handle, the contact tube 2, the welding current conductor 17, the conductor 16, and the positive bus bar 14. The ratio of the resistance of the resistors 27 and 28 is such as to render the voltage appearing over the resistor 27 lower than the lowest welding arc voltage occurring during welding. The arrangement of other elements shown in FIG. 1 will appear from the following description of the operation of the device.

Prior to starting the welding operation, the operator closes the switches 11, 12 and 33. The switch 33 connects the pump motor 50 and the fan motor 51 in circuit with the bus bars 14 and 15 energized by the rectifier 13, so that the pump 22 and the fan 21 start to work. The relay 23 in the fan motor circuit is energized and closes its normally open contact 23a. The flow sensing device 24 in the coolant circulation system is operated by the flow of coolant and closes its normally open contact 24a. The start relay 29 is energized by the current flowing in the circuit branch connected in parallel to the resistor 27, as above described, and opens its normally closed contact 29a.

The operator starts the welding operation by operating the pushbutton switch 32. The contact 32a of said switch breaks the circuit of the relay 29. The relay drops off, making its normally closed contact 29a close a control circuit from the positive bus bar 14 through the winding of a relay 34 and the relay contacts 23a, 29a and 24a to the negative bus bar 15. The relay 34 closes its normally open contacts 34a, 34b. The contact 34a closes the energizing circuits of the winding of the relay 35 and the winding 36 controlling the magnet valve 36a, said windings being connected in parallel. The contact closes the energizing circuit of a relay 37. The relay 35 closes its normally open contact 35a controlling a contactor (not shown) in the rectifier unit 10, causing said contactor to operate and supply the welding voltage to the conductors 17 and 19. The magnet valve 36a opens, so that shielding gas is supplied to the welding gun through the conduit 7. The closure of the normally open contact 37a of the relay 37 energizes the motor 52, causing the electrode advancing mechanism 25 to start feeding the electrode 3 towards the work. The contact of the electrode with the workpiece starts the flow of welding current and ignites the arc.

During welding, spatter enters the space between the contact tube 2 and the nozzle 5 and gradually forms a deposit bridging the insulation between said parts. If during the welding operation the nozzle 5 happens to touch the workpiece, the welding voltage will cause a leakage current to flow through said bridge. The leakage current, if allowed to grow unrestrictedly, would initiate an arc between the contact tube and the gas nozzle, resulting in serious damage to both of said parts. To avoid this, the invention provides means for monitoring the insulation resistance between the contact tube and the shielding gas nozzle, said means being adapted to react to a decrease of the insulation resistance before said resistance has dropped to the level where initiation of an arc may occur. In the apparatus of FIG. 1, the insulation resistance forms part of a monitoring circuit comprising the positive bus bar 14, the conductor 16, the welding current conductor 17, the contact tube 2, the insulation resistance between the contact tube 2 and the gas nozzle 5, the gas nozzle 5, a rectifier element 39, the control conductor 30, the winding of the start relay 29, the resistor 28 and the negative bus bar 15. The forward direction of the rectifier element 39 is such as to permit a current in said circuit motor by the action of the bus bar voltage. When the insulation level drops sufficiently to cause the circuit current to reach the magnitude required for operation of the relay 29, said relay operates, causing its normally closed contact 29a to break the energizing circuit of the relays 34 and 37. Both of said relays drop off. The normally open contact 37a of the relay 37 interrupts the power supply to the wire advancement motor 52, and the normally open contact 34a breaks the energizing circuit of the relay 35 and the winding 36 controlling the valve 36a. The contact 35a returns to its normally open position, causing the welding current contactor of the rectifier unit to break the welding circuit, and the valve 36a closes.

The welding operation thus automatically interrupted cannot be started again until the conducting deposit of spatter in the nozzle has been removed.

It will be noted that the relay 29 has a double function. First, it serves as a start relay controlled by the pushbutton switch 32. Secondly, it serves as a monitoring relay controlled by the insulation resistance between the contact tube and the shielding gas nozzle.

The rectifier 39 provided in series with the winding of the monitoring relay 29 ensures that no false operation of said relay 29 results if the shielding gas nozzle 5 occasionally makes contact with the work during the welding operation. Under said condition, the voltage acting on the winding of the monitoring relay 29 is composed of two components, to wit, the arc voltage acting in the reverse direction of the rectifier element 39, and the voltage appearing over the resistor 27. Said last-mentioned voltage being lower than the arc voltage, the resulting voltage acts in the reverse direction of the rectifier element 39 and therefore produces no current through the winding of the relay 29.

Under certain conditions, short circuits of short duration may occur during the welding process in connection with the transfer of metal from the electrode to the work. As the voltage appearing over the resistor 27 is larger than the very low short circuit voltage, a current will flow through the winding of the monitoring relay 29 during the short circuit periods. Said current is, however, of too short a duration to be able to operate the relay 29. Said relay may, if required, have delayed-operation characteristics. On the other hand, a prolonged short circuit will cause the monitoring relay to react. It is, therefore, sometimes advantageous to keep the gas nozzle in contact with the work at the starting of the welding process, in order to ensure that a short circuit caused by misfiring of the arc is not unduly prolonged.

In FIG. 2, elements corresponding to elements in FIG. 1 have been given the same reference numerals. In the following description of the apparatus according to FIG. 2, the switches 11, 12 and 33 are assumed to be closed. The apparatus comprises a special monitoring relay 41 and a start relay 46 having no monitoring function. The winding of the monitoring relay 41 is connected in a circuit extending from the positive bus bar 14 through a resistor 40, the winding of the relay 41 and a resistor 42 to the negative bus bar 15. The current in said circuit is sufficient to cause the monitoring relay to operate, closing its normally open contact 41a. The pushbutton switch 32 of the welding gun has a normally open contact 43 connected in a circuit from the positive bus bar 14 through the conductor 16, the welding current conductor 17, the contact tube 2, a resistor 44, the contact 43, the control conductor 30, a resistor 45 and the winding of the start relay 46 to the negative bus bar 15. The normally open contact 46a of the start relay 46 is connected in a control circuit which is identical with the one described with reference to FIG. 1 except for the addition of the contact 41a of the monitoring relay 41. The closing of the control circuit produces the same effects as the closing of the corresponding control circuit of FIG. 1.

The resistor 44 is connected in parallel to the insulation resistance between the contact tube 2 and the gas nozzle 5 in series with a rectifier element 47. Moreover, a second rectifier element 49 is provided in a transversal circuit branch connecting the positive end of the resistor 42 with the positive end of the circuit branch comprising the resistor 45 and the winding of the start relay 46. Consequently, the closing of the contact 43 of the pushbutton switch 32 not only energizes the start relay 46 but also connects the insulation resistance between the members 2 and 5 in parallel with the series connection of the winding of the monitor relay 41 and the resistor 40 through said rectifier element 49. The polarity of said rectifier elements is such as to permit a flow of current in a circuit from the positive bus bar 14 through the conductor 16, the welding current conductor 17, the contact tube 2, the insulation resistance between the contact tube and the gas nozzle 5, the gas nozzle, the rectifier element 47, the closed contact 43 of the pushbutton switch 32, the control conductor 30, the rectifier element 49 and the resistor 42 to the negative bus bar 15. For reasons which will appear later, the resistance of the resistor 44 is so dimensioned that the potential drop in said resistance is lower than the welding arc voltage.

The potential difference appearing over the series connection of the resistor 40 and the monitor relay winding may, for instance, be equal to the potential difference appearing over the resistor 44 as long as no leakage current flows from the contact tube 2 to the gas nozzle 5. As the insulation between said members deteriorates, the potential difference between said members decreases, resulting in a corresponding decrease of the potential difference acting on the series connection of the resistor 40 and the winding 41. When the insulation resistance drops to a predetermined level, the monitoring relay 41 drops off, causing its normally open contact 41a to break the control circuit above described, so that the welding operation is interrupted.

The capacitor 48 connected in parallel with the winding of the monitoring relay delays the dropoff of the relay.

The purpose of the rectifier element 47 is to prevent occasional contact between the gas nozzle 5 and the work from causing overloading of the resistor 44 or unwanted dropoff of the relay 46. Said contact establishes a parallel circuit to the welding arc from the contact tube 2 through the resistor 44, the rectifier element 47 and the gas nozzle 5 to the work 18. As, however, the arc voltage exceeds the potential difference over the resistor 44, the resulting voltage in said circuit acts in the reverse direction of the rectifier element. Consequently, no current will flow.

If the gas nozzle 5 makes contact with the work, a short circuit between the electrode and the work will tend to deenergize the monitoring relay. However, short circuits of the very short duration usual in gas-shielded arc welding do not cause the monitoring relay to drop off.

The rectifier element 49 prevents an unwanted excitation of the relay 46 through a series circuit comprising the elements 40, 41, 45, 46.

In the embodiments above described, the welding operation is automatically discontinued and the welding power switched off on detection by the monitoring circuit of drop of the insulation resistance below a predetermined level. The invention also includes embodiments in which the insulation monitoring means operate an alarm device, for instance a lamp or a bell, by means of which the operator is informed that the gas nozzle requires to be cleaned of spatter deposits.

We claim:

1. In gas-shielded arc welding with a fusible electrode which is pushed by a motor-driven wire advancing mechanism towards the workpiece through a guide and contact member serving to transmit the welding current to the electrode, said guide and contact member being surrounded by a shielding gas nozzle electrically insulated from said guide and contact member, the method which comprises monitoring the insulation resistance between said guide and contact member and said shielding gas nozzle to provide an output signal when said resistance is lower than a predetermined magnitude.

2. A method as claimed in claim 1 in which said output signal is used to operate switch means to break the welding circuit.

3. A method as claimed in claim 1 in which said output signal is used to operate means for stopping the advancement of the fusible electrode.

4. A method as claimed in claim 1 in which said output signal is used to operate means for cutting off the supply of shielding gas to the shielding gas nozzle.

5. In apparatus for gas-shielded arc welding with a fusible electrode comprising a guide and contact member to guide the electrode tip towards the welding spot, circuit means connecting said guide and contact member to one terminal of a source of welding power, a shielding gas nozzle surrounding said guide and contact member, said nozzle being electrically insulated from said guide and contact member, conduit means connecting said nozzle to a source of shielding gas, a valve in said conduit means, an electrode advancing mechanism to push the fusible electrode through said guide and contact member, and a motor for driving said mechanism, the improvement which comprises a monitoring circuit including the insulation resistance between said guide and contact member and said shielding gas nozzle as well as a source of control current and means for sensing a change of monitoring circuit conditions resulting from a decrease of the magnitude of said insulation resistance, and control means actuated by said sensing means on detection by said sensing means of a magnitude of the insulation resistance below a predetermined level.

6. Apparatus as claimed in claim 5 in which said control means comprise switching means for breaking the welding circuit.

7. Apparatus as claimed in claim 5 in which said sensing means is a monitoring relay the winding of which is connected in series with said insulation resistance.

8. Apparatus as claimed in claim 5 in which said monitoring circuit comprises one branch containing the winding of a monitoring relay constituting the sensing means of the monitoring circuit, and a second branch containing said insulation resistance, said branches being connected in parallel with each other and in series with a common resistance, whereby a decrease of said insulation resistance results in a decrease of the current passing through said monitoring relay.

9. Apparatus as claimed in claim 8 which further comprises a normally closed manual switch arranged in circuit relation to short circuit said insulation resistance, and additional switching means constructed and arranged to control the electrode advancement motor and to be controlled by said monitoring relay, the arrangement being such that operation of said monitoring relay causes said additional switching means to switch off the motor.

10. Apparatus as claim in claim 7 in which the source of welding power as well as the source of control current are DC sources and in which the winding of the monitoring relay in series with said insulation resistance is connected between points of a control current supply circuit having a potential difference lower than the welding arc voltage, the polarity of said potential difference being such as to impart to said guide and contact member a control voltage polarity identical with its welding voltage polarity, said apparatus further comprising a rectifier element connected with said winding in such a way as to admit a flow of current through said winding in that direction only which corresponds to said potential difference.

11. Apparatus as claimed in claim 10 in which the rectifier element is connected in series with the winding of the monitor relay.

12. Apparatus as claimed in claim 5, in which the source of control current is a DC source and in which the monitoring circuit comprises a first branch containing the winding of a monitoring relay and connected at one extremity to one terminal of the source of control current, a second branch comprising said insulation resistance in series with a normally open manual switch connected to said shielding gas nozzle, said insulation resistance being shunted by a resistor connected at one extremity to said guide and contact member and to said one terminal of the source of control current and at the other extremity to said normally open switch, a third branch comprising a resistor connected between said first-mentioned branch and the other terminal of the source of control current, and a fourth branch connected between said second branch and said other terminal of the source of control current, said fourth branch containing the winding of a start relay, a rectifier element connecting the junction of said first and third branches with the junction of said second and fourth branches, the polarity of said rectifier element being such as to prevent the source of control current from causing a flow of current through the series connection of said first and fourth branches, and welding current switching means controlled by said start relay and said monitoring relay in such a way that said switching means are caused to close the welding current when both of the relays are operated and to remain in said state only as long as both of the relays remain operated, dropping off of either relay causing the switching means to break the welding current.

13. Apparatus as claimed in claim 12 in which the source of welding power is a DC source and in which the potential difference across the resistor shunting said insulation resistance is lower than the welding arc voltage and has a polarity such as to impart to said guide and contact member a control voltage polarity identical with its welding voltage polarity, said apparatus further comprising a rectifier element connected between said shielding gas nozzle and said manual switch, said shunting resistor being connected across the series connection of said insulation resistance and said last-mentioned rectifier element, which is connected so as to admit a flow of current caused by said potential difference.

PO-1050
(5/69)

UNITED STATES PATENT OFFICE
CERTIFICATE OF CORRECTION

Patent No. 3,582,606        Dated June 1, 1971

Inventor(s) Jan-Erik Henriksen and Klas Bertil Weman

It is certified that error appears in the above-identified patent and that said Letters Patent are hereby corrected as shown below:

Title page, left column Item [73], "Elecktriska" should read --Elektriska--; Item [33],"Switzerland" should be --Sweden--.

Signed and sealed this 23rd day of November 1971.

(SEAL)
Attest:

EDWARD M.FLETCHER,JR.      ROBERT GOTTSCHALK
Attesting Officer             Acting Commissioner of Patents